US011965953B2

(12) United States Patent
Gong et al.

(10) Patent No.: US 11,965,953 B2
(45) Date of Patent: Apr. 23, 2024

(54) RADAR DATA TRANSCEIVER, RANGING METHOD, AND LIDAR

(71) Applicant: SUTENG INNOVATION TECHNOLOGY CO., LTD., Shenzhen (CN)

(72) Inventors: Changsheng Gong, Shenzhen (CN); Yajun Du, Shenzhen (CN)

(73) Assignee: SUTENG INNOVATION TECHNOLOGY CO., LTD., Shenzhen (CN)

(*) Notice: Subject to any disclaimer, the term of this patent is extended or adjusted under 35 U.S.C. 154(b) by 76 days.

(21) Appl. No.: 17/951,183

(22) Filed: Sep. 23, 2022

(65) Prior Publication Data

US 2023/0109123 A1  Apr. 6, 2023

(30) Foreign Application Priority Data

Sep. 30, 2021 (CN) .......................... 202111163725.9

(51) Int. Cl.
*G01S 13/86* (2006.01)
*G01S 13/931* (2020.01)
*G01S 17/86* (2020.01)

(52) U.S. Cl.
CPC .......... *G01S 13/865* (2013.01); *G01S 17/86* (2020.01); *G01S 13/931* (2013.01)

(58) Field of Classification Search
CPC ...... G01S 13/865; G01S 13/931; G01S 17/86; G01S 17/931
See application file for complete search history.

(56) References Cited

U.S. PATENT DOCUMENTS

| 7,462,808 B2* | 12/2008 | Lustenberger .......... G01S 17/36 356/432 |
| 10,539,457 B2* | 1/2020 | Dieguez Barrientos ..................... H03K 5/1534 |
| 10,962,628 B1* | 3/2021 | Laifenfeld .............. G01S 7/487 |

(Continued)

FOREIGN PATENT DOCUMENTS

| JP | 2020024138 A | 2/2020 |
| WO | 2020223561 A1 | 11/2020 |
| WO | 2022264504 A1 | 12/2022 |

OTHER PUBLICATIONS

Office Action issued in related Japanese Application No. 2022-142640, dated May 23, 2023, 4 pages.

(Continued)

*Primary Examiner* — Peter M Bythrow
(74) *Attorney, Agent, or Firm* — BAYES PLLC

(57) ABSTRACT

A radar data transceiver, a ranging method, and a LiDAR are provided. The transceiver includes: a synchronization module, configured to generate a synchronization signal and send the synchronization signal to an emission module and a receiving module separately; the emission module, connected with the synchronization module and configured to delay the synchronization signal according to a preset delay policy, generate a first emission signal, and emit the first emission signal; and the receiving module, connected with the synchronization module and configured to receive a reflected signal, generate a first histogram according to the reflected signal and the synchronization signal, and superimpose histograms obtained by n measurements to generate an echo signal.

8 Claims, 18 Drawing Sheets

(56) References Cited

U.S. PATENT DOCUMENTS

| | | | | |
|---|---|---|---|---|
| 11,105,925 B2* | 8/2021 | Pacala | ............... | G01S 17/89 |
| 11,476,372 B1* | 10/2022 | Mandai | ............ | H01L 31/02027 |
| 11,585,908 B2* | 2/2023 | Ozaki | ............... | H01L 31/107 |
| 11,624,835 B2* | 4/2023 | Pacala | ............... | G06T 7/55 |
| | | | | 356/5.01 |
| 11,656,342 B2* | 5/2023 | Kulesh | ............... | G01S 17/18 |
| | | | | 356/5.01 |
| 11,668,826 B2* | 6/2023 | Hata | ............... | G01S 7/4863 |
| | | | | 356/4.01 |
| 11,846,732 B2* | 12/2023 | Horino | ............... | G01S 7/4863 |
| 11,852,727 B2* | 12/2023 | Laflaquière | ............ | G01S 7/4815 |
| 11,876,557 B1* | 1/2024 | Venkataraman | ...... | H04L 1/0016 |
| 2016/0209498 A1* | 7/2016 | Kanter | ............... | G01S 7/487 |
| 2019/0064329 A1* | 2/2019 | Liu | ............... | G01S 17/10 |
| 2020/0174120 A1* | 6/2020 | Steigemann | ............ | G01S 17/08 |
| 2021/0231782 A1* | 7/2021 | Henderson | ............ | G01S 7/4915 |
| 2021/0247502 A1* | 8/2021 | Kim | ............... | G01S 7/4863 |
| 2021/0293958 A1* | 9/2021 | Hirono | ............... | G01S 7/4863 |
| 2022/0003849 A1* | 1/2022 | Tayu | ............... | G01S 7/4808 |
| 2022/0029633 A1* | 1/2022 | Beuschel | ............ | H03M 1/56 |
| 2022/0035011 A1* | 2/2022 | Pacala | ............... | G01S 17/931 |
| 2022/0350001 A1* | 11/2022 | Sakakibara | ............ | G01S 7/4861 |
| 2023/0176223 A1* | 6/2023 | Pacala | ............... | G01S 7/4865 |
| | | | | 356/5.01 |
| 2024/0004070 A1* | 1/2024 | Inoue | ............... | G01S 17/14 |

OTHER PUBLICATIONS

European Search Report issued in related European Application No. 22197789.5, dated May 30, 2023, 13 pages.

First Office Action issued in related Chinese Application No. 202111163725.9, dated Aug. 29, 2023, 10 pages.

* cited by examiner

RADAR DATA TRANSCEIVER, RANGING METHOD, AND LIDAR

CROSS-REFERENCE TO RELATED APPLICATION

The present application claims the benefit of priority to China Patent Application No. CN202111163725.9, filed on Sep. 30, 2021, the content of which is incorporated herein by reference in its entirety.

TECHNICAL FIELD

This application pertains to the field of radar technologies, particularly, to a radar data transceiver, a ranging method, and a LiDAR.

BACKGROUND

A LiDAR is usually used in fields such as automated driving, transport vehicles, robots, and public smart transportation due to its advantages such as high resolution, high sensitivity, strong anti-interference ability, and all-weather availability.

A LiDAR usually receives an echo signal by using a receiving module composed of a single photon avalanche diode (SPAD). When the SPAD is used, the ranging accuracy of the LiDAR depends on the sampling accuracy of a time-to-digital converter (TDC). When the sampling frequency of the TDC is 1 GHz (that is, a sampling interval is 1 ns), the ranging accuracy is about 15 cm (ranging accuracy=C*1 ns/2, where C is the speed of light). Such ranging accuracy cannot meet requirements in many application scenarios.

To improve the ranging accuracy of the LiDAR, the sampling frequency of the TDC can be increased. However, when the sampling frequency of the TDC is higher, more heat is generated in the receiving module (which can be integrated into a chip), and therefore, power consumption is increased, the chip needs to have higher reliability and stability, and the TDC with the higher sampling frequency is manufactured at higher costs.

SUMMARY

Embodiments of this application provide a radar data transceiver, a ranging method, and a LiDAR, to improve ranging precision without the need of increasing the sampling frequency of a TDC.

According to a first aspect, an embodiment of this application provides a radar data transceiver, including:
- a synchronization module, configured to generate a synchronization signal and send the synchronization signal to an emission module and a receiving module separately;
- the emission module, connected with the synchronization module and configured to delay the synchronization signal according to a preset delay policy, generate an emission signal, and emit the emission signal; and
- the receiving module, connected with the synchronization module and configured to receive a reflected signal, generate a histogram according to the reflected signal and the synchronization signal, and superimpose histograms obtained by n measurements to generate an echo signal, wherein
- n is an integer greater than or equal to 2.

In an embodiment of the first aspect, the emission module includes:
- an emission fine-jittering assembly, configured to delay the synchronization signal according to the preset delay policy to generate an emission pulse signal;
- a drive circuit, connected with the emission fine-jittering assembly and configured to drive the emission pulse signal, generate a current signal, and output the current signal to a laser emitter; and
- the laser emitter, connected with the drive circuit and configured to generate the emission signal based on the current signal, and emit the emission signal.

In an embodiment of the first aspect, the emission fine-jittering assembly includes:
- a time delay module, configured to delay the synchronization signal and generate the emission pulse signal; and
- a delay policy selection module, connected with the time delay module and configured to determine the preset delay policy.

In an embodiment of the first aspect, the time delay module includes n PCB wires and a switch selection assembly.

In an embodiment of the first aspect, the time delay module includes an input pin, an input delay unit, a delay resolution module, a carry chain module, an output delay unit, an output pin, and a delay mapping allocation table.

In an embodiment of the first aspect, the time delay module includes an input pin, an input delay unit, a delay resolution module, a carry chain module, an output delay unit, an output pin, and a delay mapping allocation table.

In an embodiment of the first aspect, the time delay module includes an input delay unit, a delay resolution module, an output delay unit, an output pin, and a delay mapping allocation table.

In an embodiment of the first aspect, the time delay module includes an input delay unit, a delay resolution module, a carry chain module, an output pin, and a delay mapping allocation table.

In an embodiment of the first aspect, the receiving module includes:
- a photoelectric converter, configured to convert a received reflected signal into a current signal;
- a conditioning circuit, connected with the photoelectric converter and configured to amplify the current signal, convert the current signal into a voltage signal and perform filtering, and then output the voltage signal to a TDC collecting assembly;
- the TDC collecting assembly, connected with the conditioning circuit and configured to generate a histogram corresponding to the reflected signal based on the signal output by the conditioning circuit and the synchronization signal; and
- a data processing assembly, connected with the TDC collecting assembly and configured to superimpose n histograms output by the TDC collecting assembly to obtain a superimposed histogram, and determine the corresponding echo signal based on the superimposed histogram.

According to a second aspect, an embodiment of this application provides a ranging method, applied to a radar data transceiver, where the ranging method includes:
- receiving a reflected signal, where the reflected signal is a signal reflected after an emission signal emitted based on a preset delay policy reaches a target object;
- generating a histogram based on a synchronization signal and the reflected signal;

superimposing histograms obtained by n measurements to obtain a superimposed histogram, where n is an integer greater than or equal to 2;

performing detection based on the superimposed histogram to obtain an echo signal corresponding to the superimposed histogram; and performing ranging based on the echo signal.

According to a third aspect, an embodiment of this application provides a LiDAR, where the LiDAR includes the radar data transceiver according to the first aspect.

Compared with the prior art, the embodiments of this application have the following beneficial effects:

Based on the radar data transceiver, the ranging method, and the LiDAR provided in the embodiments of this application, the synchronization signal can be finely jittered, so that there is a specific time difference between a plurality of emitted emission signals, and then histograms corresponding to a plurality of received reflected signals are superimposed, which can improve ranging precision. That is, ranging precision is improved, manufacturing costs of the radar are effectively reduced, and power consumption of the radar is also reduced without a need of increasing the sampling frequency of a TDC.

BRIEF DESCRIPTION OF DRAWINGS

To explain the technical solution in embodiments in this application, the following briefly introduces the accompanying drawings to describe the embodiments or the prior art. The accompanying drawings in the following description are only some embodiments of this application. A person of ordinary skill in the art may still derive other drawings from these accompanying drawings without creative efforts.

DETAILED DESCRIPTION

For the purpose of illustration rather than limitation, the following describes details such as a system structure and technology, to facilitate understanding of the embodiments of this application. However, a person skilled in the art should understand that this application can also be implemented in other embodiments without these details. In other cases, detailed descriptions of well-known systems, apparatuses, circuits, and methods are omitted, to prevent unnecessary details from causing distraction from the description of this application.

It should be further understood that the term "and/or" used in this specification and appended claims of this application refers to any combination of one or more of the associated items listed and all possible combinations thereof, and inclusion of these combinations. In addition, in the descriptions of this specification and the appended claims of this application, the terms "first", "second", "third" and the like are merely intended for differential description, and should not be understood as any indication or implication of relative importance.

It should be further understood that reference to "an embodiment", "some embodiments", or the like described in this specification of this application means that one or more embodiments of this application include a feature, structure, or characteristic described with reference to the embodiments. Therefore, expressions such as "in an embodiment", "in some embodiments", "in some other embodiments", and "in some additional embodiments" appearing in different places in this specification do not necessarily indicate a reference to the same embodiment, but mean "one or more but not all embodiments", unless otherwise specified in another way. The terms "include", "comprise", "have", and variants thereof all mean "including but not limited to", unless otherwise specified in another way.

A LiDAR is an automated remote sensing device for detection using a laser as an emitting light source and a photoelectric detection technology. A working principle of the LiDAR is that a detection signal is emitted to a target object, after the detection signal reaches the target object, the target object reflects the detection signal to form an echo signal, the receiving module can receive the echo signal and process a received echo signal, to obtain information such as distance, size, speed, and reflectivity of the target object.

Figure 1:
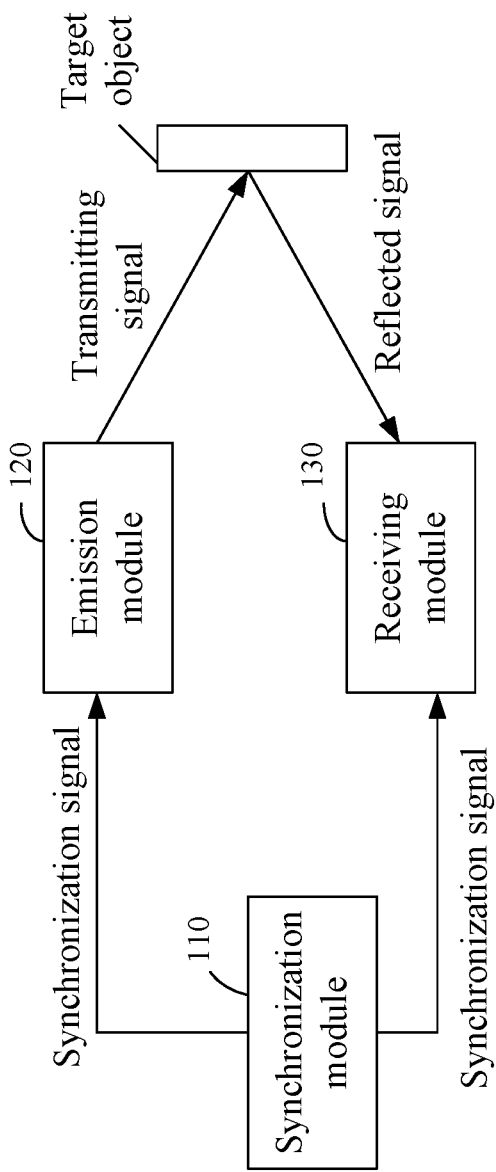
FIG. 1 is a schematic structural diagram of a radar data transceiver according to an embodiment of this application.

Referring to FIG. 1, FIG. 1 is a schematic structural diagram of a radar data transceiver according to an embodiment of this application. The radar data transceiver may be arranged in the LiDAR. As shown in FIG. 1, the radar data transceiver provided in this embodiment of this application may include a synchronization module 110, an emission module 120, and a receiving module 130.

The synchronization module 110 is configured to generate a synchronization signal and send the synchronization signal to an emission module 120 and a receiving module 130 separately.

The emission module 120 is connected with the synchronization module 110 and configured to delay the synchronization signal according to a preset delay policy, generate an emission signal, and emit the emission signal.

The receiving module 130 is configured to receive a reflected signal, generate a histogram according to the reflected signal and the synchronization signal, and superimpose histograms obtained by n measurements to generate an echo signal.

In this embodiment of this application, the synchronization signal may be a synchronization clock pulse signal generated by a synchronization clock. Each time a measurement period starts, the synchronization clock generates the synchronization signal, and sends the synchronization signal to the emission module 120 and the receiving module 130 respectively.

The emission signal emitted by the emission module 120 is generated based on the synchronization signal. In some embodiments, the emission module 120 may generate the emission pulse signal based on the synchronization clock pulse signal, and then convert the emission pulse signal into a laser signal, so that the laser signal is emitted by a laser emitter.

The measurement period refers to a preset emission period in the radar data transceiver. That is, each time the measurement period starts, the radar data transceiver emits a radar signal to detect the target object. The measurement period can be set according to an actual application need, and is not limited in this application.

In this embodiment of this application, to measure a position of a target object, the radar data transceiver can continuously emit n emission signals, then receive n reflected signals, superimpose n received histograms to obtain a corresponding echo signal, and then perform ranging based on the echo signal. It should be noted that, for a process of superimposing the n received histograms, refer to the detailed description of the receiving module. Details are not described herein again to avoid redundancy. It should also be noted that, before the n emission signals are continuously emitted, the synchronization signal is delayed based on the preset delay policy to obtain an emission signal corresponding to each measurement period. Herein, n is an integer greater than or equal to 2.

In this embodiment of this application, the emission signal and the synchronization signal are delayed. The duration of the delay can be determined according to the preset delay policy.

The preset delay policy may be that delay duration is one delay unit during the first measurement period, delay duration is two delay units during the second measurement period, delay duration is three delay units during the third measurement period, and by analogy, delay duration is n delay units during the nth measurement period. It should be noted that the foregoing delay unit is a jittering duration set based on an actual application need, and can be set based on an actual application case. This is not limited in this application.

The preset delay policy may also be that delay duration is one delay unit during each measurement period.

The preset delay policy may also be that the delay duration for the first m measurement periods is one delay unit, and the delay duration for the following n-m measurement periods is n delay units.

It can be understood that the preset delay policy may also be another policy; in some embodiments, the preset delay policy can be set according to a measurement precision requirement, provided that the emitted emission signal meets a fine-jittering requirement.

In this embodiment of this application, the reflected signal received by the receiving module 130 is an optical signal reflected after the emission signal emitted by the emission module 120 reaches the target object. After receiving the optical signal, the receiving module 130 needs to convert the optical signal into a current signal, and then obtains a histogram corresponding to the reflected signal by using a TDC collecting assembly in the receiving module 130. The n received histograms are then superimposed to obtain a superimposed histogram.

Figure 2:
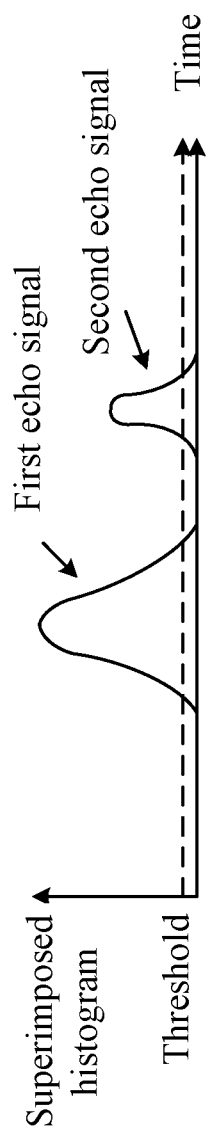
FIG. 2 is a schematic diagram of determining an echo signal by a radar data transceiver according to an embodiment of this application.

The superimposed histogram is detected to obtain a corresponding echo signal. In some embodiments, a threshold may be set, and when it is detected that the histogram exceeds the set threshold, it is determined that the echo signal is identified. For example, as shown in FIG. 2, when it is detected that the superimposed histogram exceeds the threshold, it is determined that the echo signal is detected, and therefore, two echo signals (that is, the first echo signal and the second echo signal in the figure) are detected in FIG. 2. It should be noted that the threshold may be determined based on an empirical value, and different thresholds may also be set for different precision requirements. This is not limited in this application.

Figure 3:
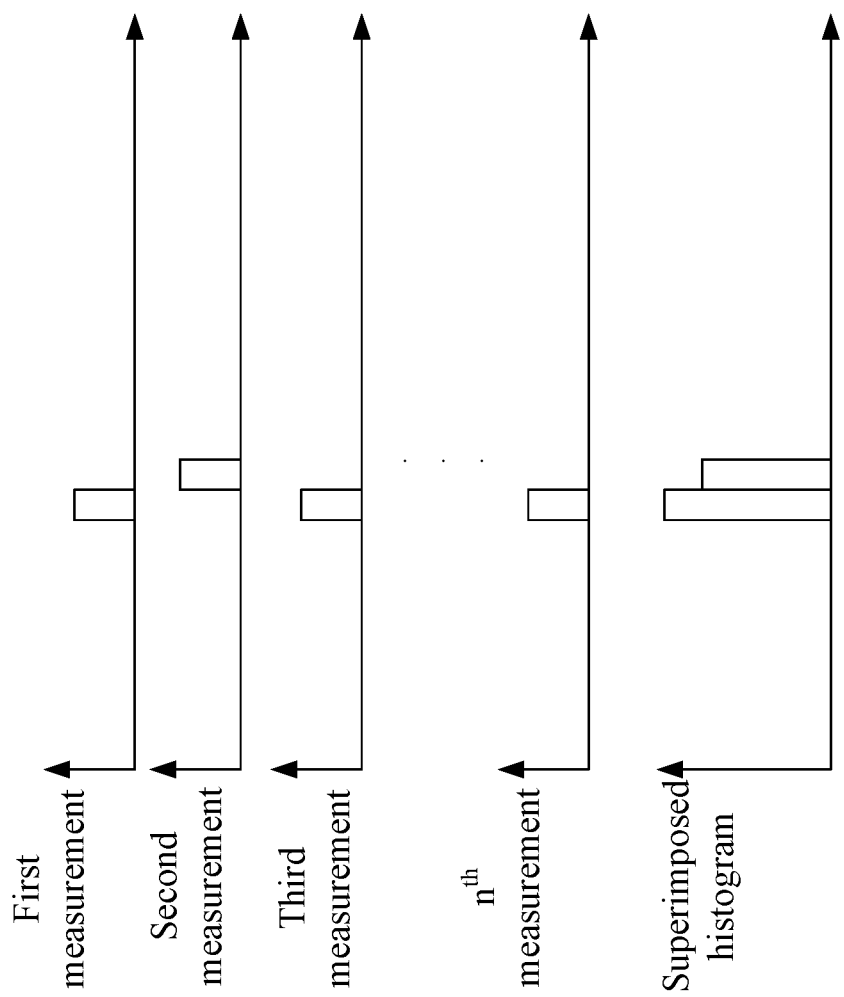
FIG. 3 is the schematic diagram of existing superimposing histograms.
Figure 4:
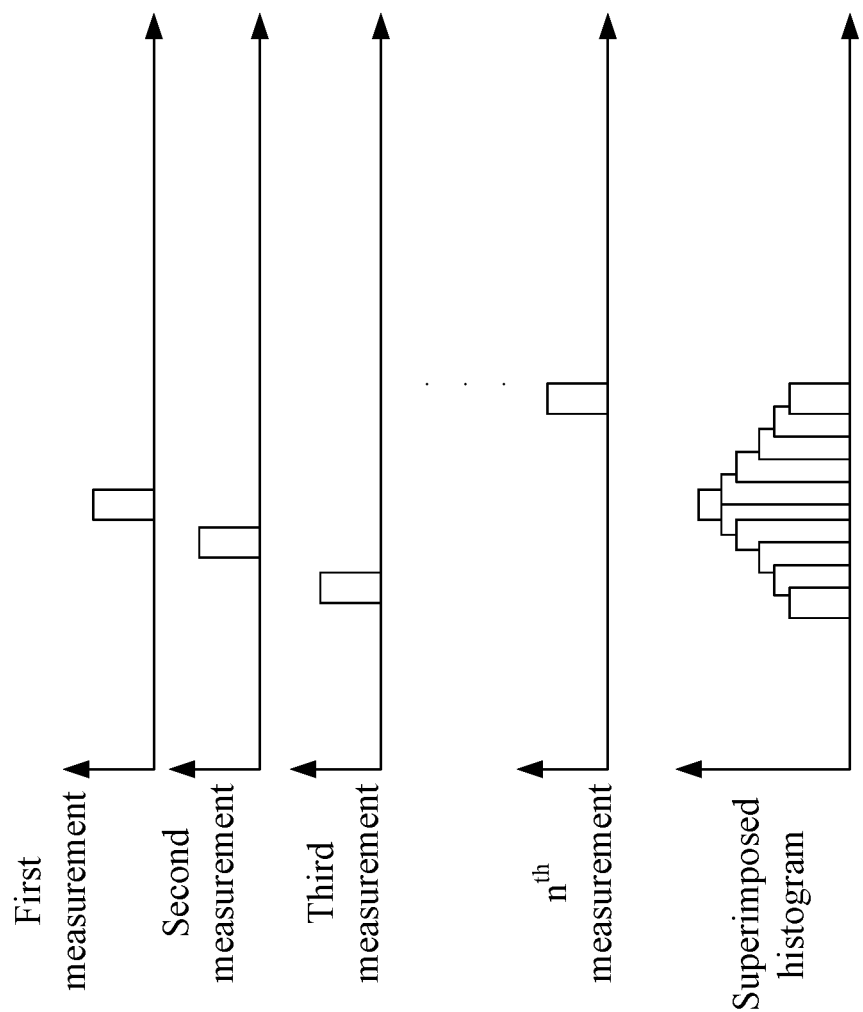
FIG. 4 is a schematic diagram of a signal obtained after histograms are superimposed by a radar data transceiver according to an embodiment of this application.

To illustrate a function of the radar data transceiver provided in this embodiment of this application, FIG. 3 shows a schematic diagram of a histogram superimposed without fine jittering (that is, the prior art), and FIG. 4 shows a schematic diagram of a histogram superimposed after a radar data transceiver in this embodiment of this application performs ranging.

It can be seen from FIG. 3 and FIG. 4 that, based on the radar data transceiver provided in this embodiment of this application, because the emitted emission signal is jittered (delayed), the superimposed histogram can reflect more distance information about the target object, which improves measurement precision. That is, the ranging precision of the radar can be effectively improved, and manufacturing costs and power consumption can be effectively reduced without the need of increasing the working frequency of the TDC.

Figure 5:
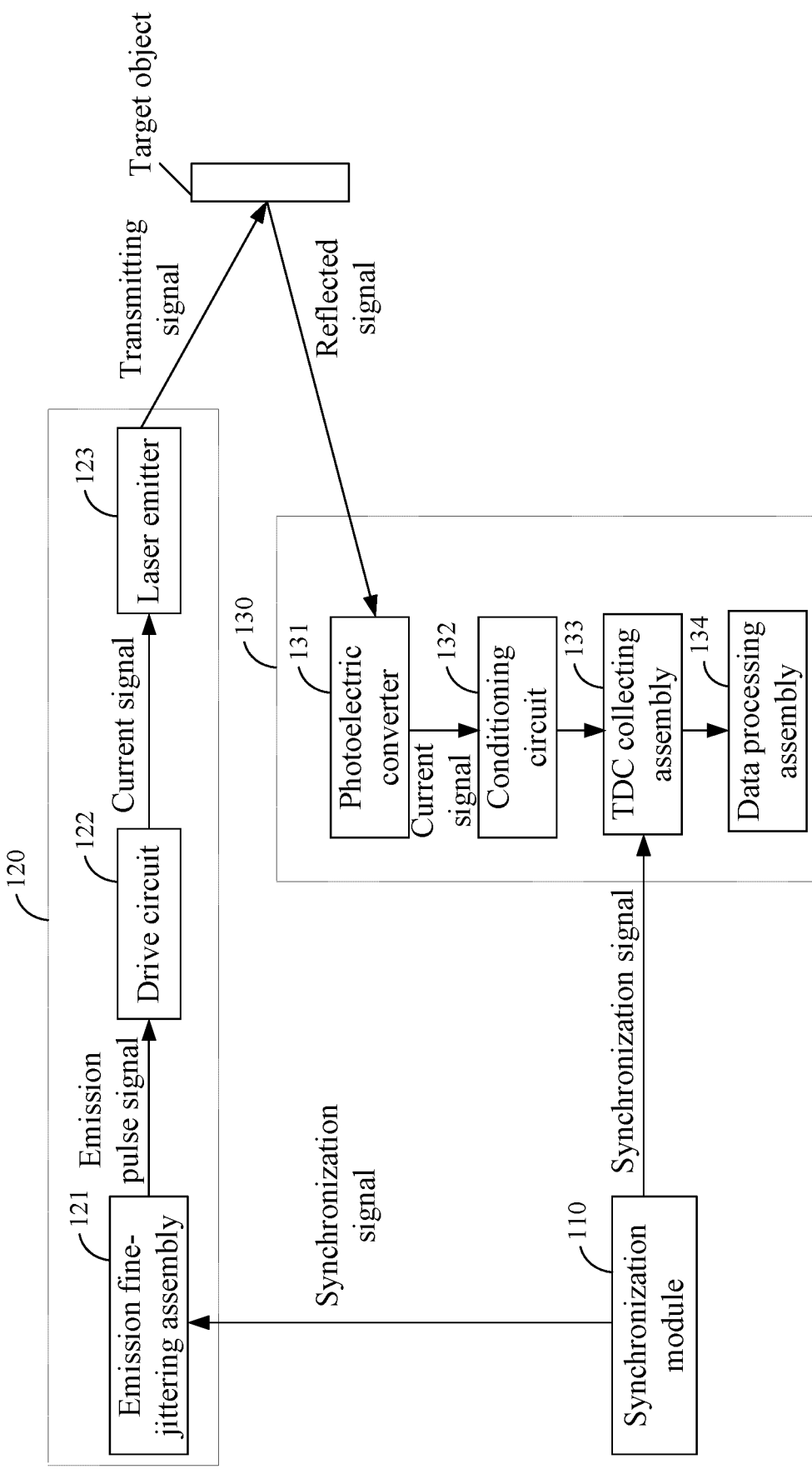
FIG. 5 is a schematic structural diagram of another radar data transceiver according to an embodiment of this application.

Referring to FIG. 5, FIG. 5 is a schematic structural diagram of another radar data transceiver according to an embodiment of this application. As shown in FIG. 5, the emission module 120 may include an emission fine jittering assembly 121, a drive circuit 122, and a laser emitter 123.

The emission fine jittering assembly 121 is configured to delay the synchronization signal according to the preset delay policy to generate an emission pulse signal.

The drive circuit 122 is connected with the emission fine jittering assembly 121 and configured to drive the emission pulse signal, generate a current signal, and output the current signal to a laser emitter 123.

The laser emitter 123 is connected with the drive circuit 122 and configured to generate an emission signal based on the current signal, and emit the emission signal.

Herein, the emission signal is a laser signal.

The emission fine jittering refers to small jittering between an actual emission pulse and a synchronization pulse. The emission fine jittering assembly 121 can ensure that there is a small jittering corresponding to the preset delay policy between the emission pulse and the synchronization pulse.

Figure 6:
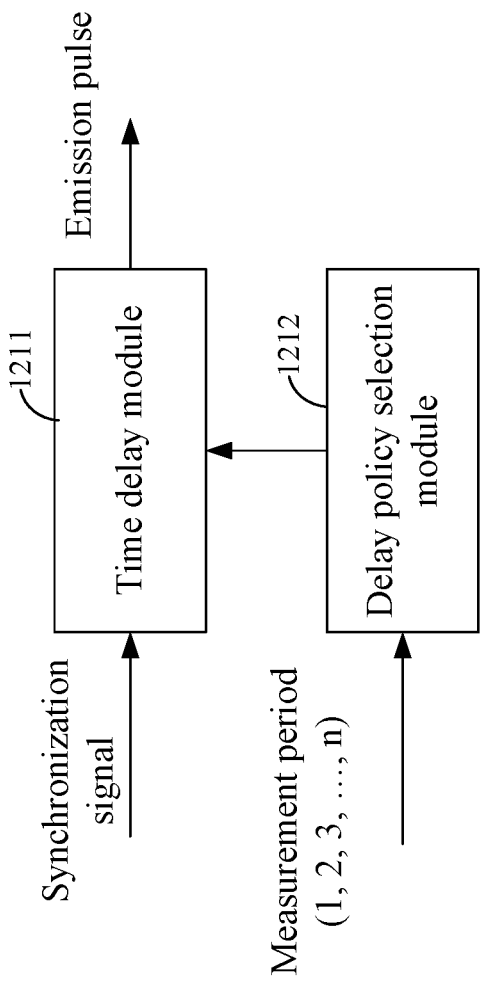
FIG. 6 is a schematic structural diagram of an emission fine-jittering assembly according to an embodiment of this application.

Referring to FIG. 6, FIG. 6 is a schematic structural diagram of an emission fine-uttering assembly according to an embodiment of this application. In an embodiment of this application, as shown in FIG. 6, the emission fine-jittering assembly 121 includes a time delay module 1211 and a delay policy selection module 1212.

The time delay module 1211 is configured to delay the synchronization signal and generate an emission pulse signal.

The delay policy selection module 1212 is connected with the time delay module 1211 and configured to determine a preset delay policy.

In some embodiments, a plurality of preset delay policies can be preset, the preset delay policy can be selected by a user, or the preset delay policy can be automatically selected by the radar data transceiver based on the ranging precision. This is not limited in this application.

The synchronization signal is delayed by the time delay module 121. The time delay module 121 can be implemented by using a hardware circuit (PCB wire), or can be implemented by using a programmable logic device (FPGA).

Figure 7:
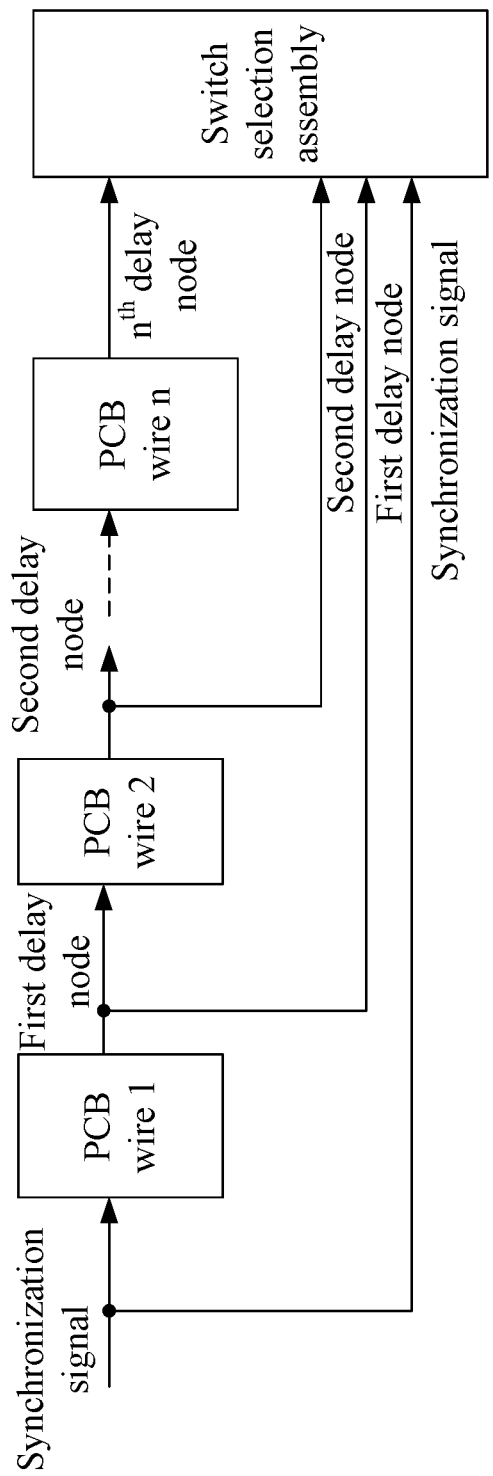
FIG. 7 is a schematic structural diagram of a time delay module according to an embodiment of this application.

Referring to FIG. 7, FIG. 7 is a schematic structural diagram of a time delay module 1211 according to an embodiment of this application.

As shown in FIG. 7, the time delay module 1211 includes n PCB wires and a switch selection assembly. When gating of the switch selection assembly is implemented for the synchronization signal and the first delay node, the synchronization pulse signal and the emission pulse signal are delayed by one delay unit, when gating of the switch selection assembly is implemented for the synchronization signal and the second delay node, the synchronization pulse signal and the emission pulse signal are delayed by two delay units, and by analogy, when gating of the switch selection assembly is implemented for the synchronization signal and the nth delay node, the synchronization pulse signal and the emission pulse signal are delayed by n delay units.

It should be noted that the gating of the switch selection assembly can be determined based on the preset delay policy determined by the delay policy selection module. That is, the delay duration of an emission signal in n measurement periods depends on the preset delay policy. The relevant content about the preset delay policy is described above, and details are not described herein again to avoid redundancy.

It should also be noted that a length of each PCB wire can be determined based on the duration of the delay unit, that is, L=t*C, where L is the length of each PCB wire, t is the duration of the delay unit, and C is the speed of light. In addition, the quantity of PCB wires included in the time delay module may depend on delay duration, that is, the maximum quantity of required delay units. In some embodiments, when a maximum of n delay units are required, the time delay module includes n PCB wires.

Figure 8:
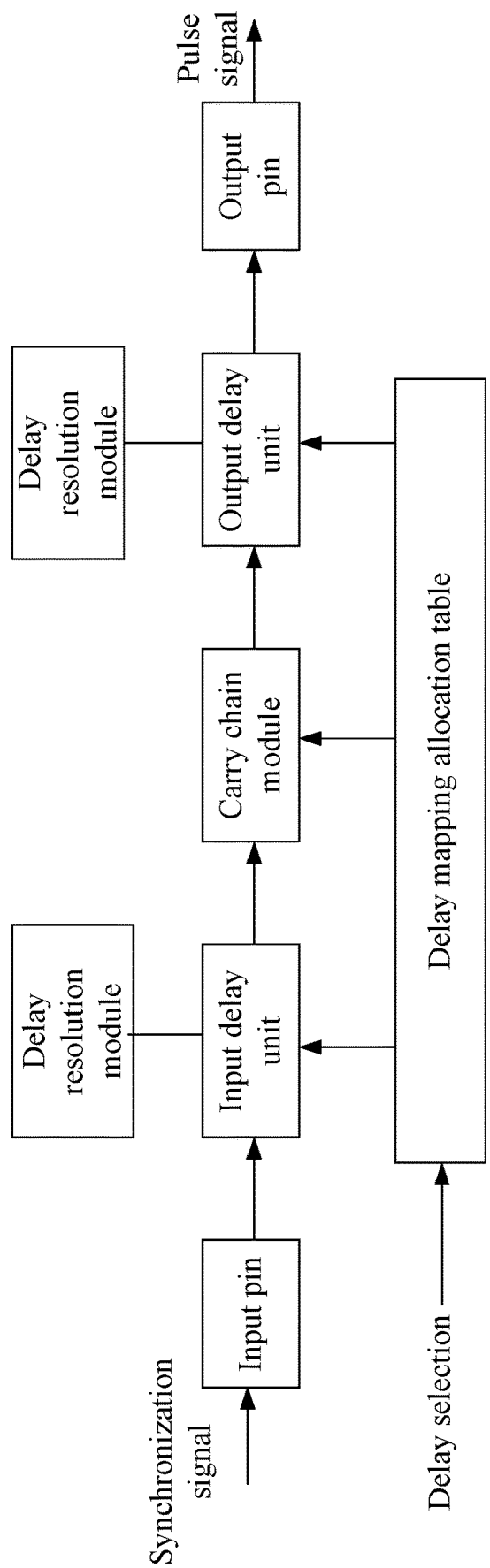
FIG. 8 is a schematic structural diagram of another time delay module according to an embodiment of this application.

Referring to FIG. 8, FIG. 8 is a schematic structural diagram of a time delay module 1211 according to another embodiment of this application.

As shown in FIG. 8, the time delay module 1211 includes an input pin, an input delay unit (IDELAY), a delay resolution module (IDELYCTRL), a carry chain module, an output delay unit (ODELAY), an output pin 1218 and a delay mapping allocation table.

The input pin and the output pin are physical pins of an FPGA chip. The input pin can be omitted, and the synchronization signal of the input pin can be input based on the interior of the FPGA chip, that is, the synchronization signal is directly input into the following assembly. The input delay unit (IDELAY), the delay resolution module (IDELYCTRL), and the output delay unit (ODELAY) are fixed basic units integrated inside the FPGA chip, and all refer to the basic units inside the FPGA chip that are configured to change the delay of a pin signal. For working principles of these basic units, refer to an existing FPGA chip. Details are not described again in this application.

Figure 9:
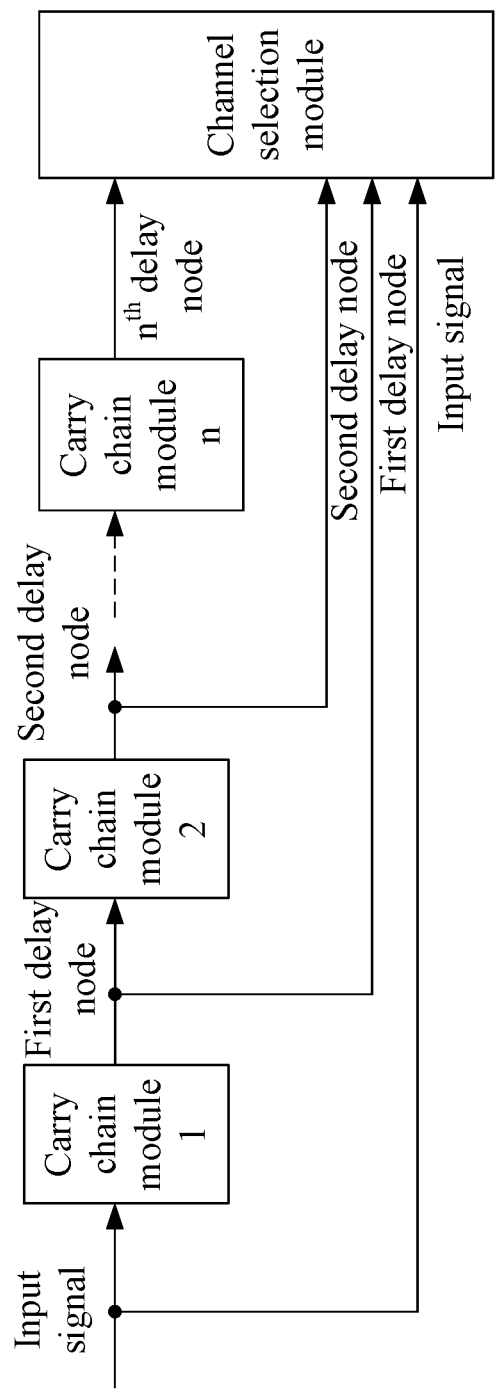
FIG. 9 is a schematic structural diagram of a carry chain module according to an embodiment of this application.

For a structure of the carry chain module, refer to a schematic structural diagram shown in FIG. 9. As shown in FIG. 9, when the delay of n delay units is required, n carry chain modules can be arranged, and each carry chain module can contain one or more carry chain units. Different numbers of carry chain units may be designed according to the required delay duration. For the setting of the number of carry chain units, refer to the following formula: num=t/(tcarry+twire). Herein, num refers to the number of carry chain units, t refers to the duration of the delay unit, tcarry refers to the delay time of each carry chain unit, and twire refers to the delay time between two carry chain units.

In actual application, a structure of the time delay module 1211 shown in FIG. 8 can also be adjusted based on a required delay time range. For example, when only a short delay is required, the input delay unit (IDELAY), the carry chain module, and the output delay unit (ODELAY) may be tailored.

In some embodiments, for some FPGA chips that do not include the input delay unit (IDELAY) 1214 or the output delay unit (ODELAY), only the carry chain module (that is, a structure shown in FIG. 9) can be used for the delay.

Figure 10A:
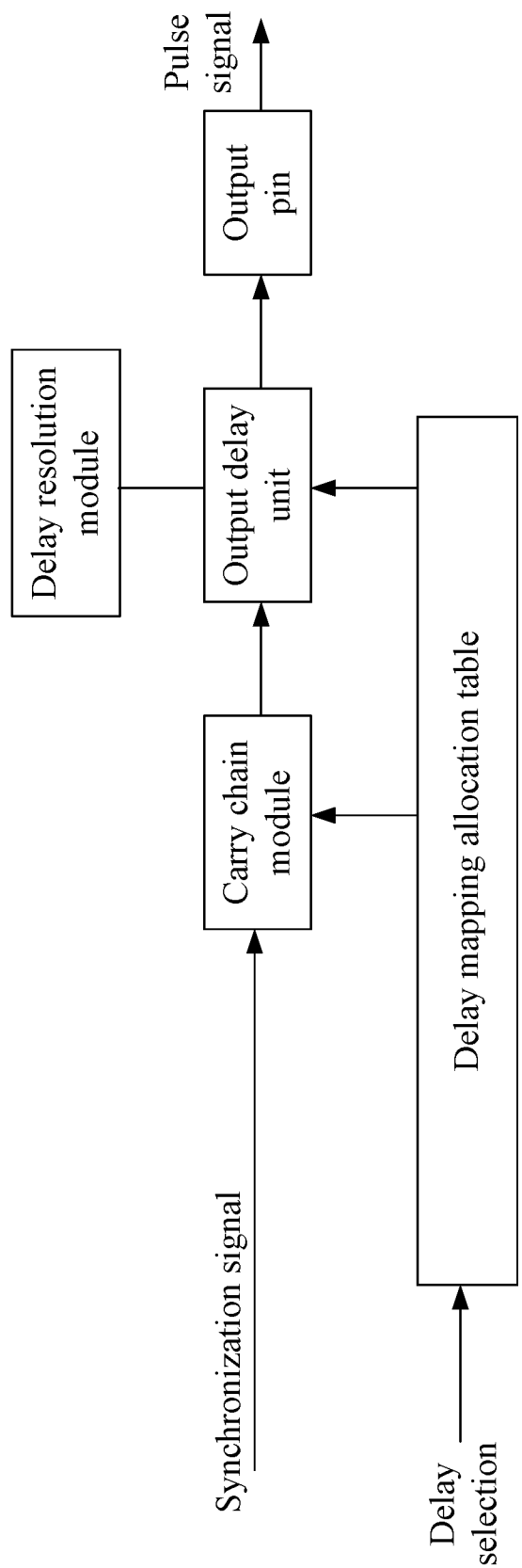
FIG. 10A is a schematic structural diagram of a tailored time delay module according to an embodiment of this application.
Figure 10B:
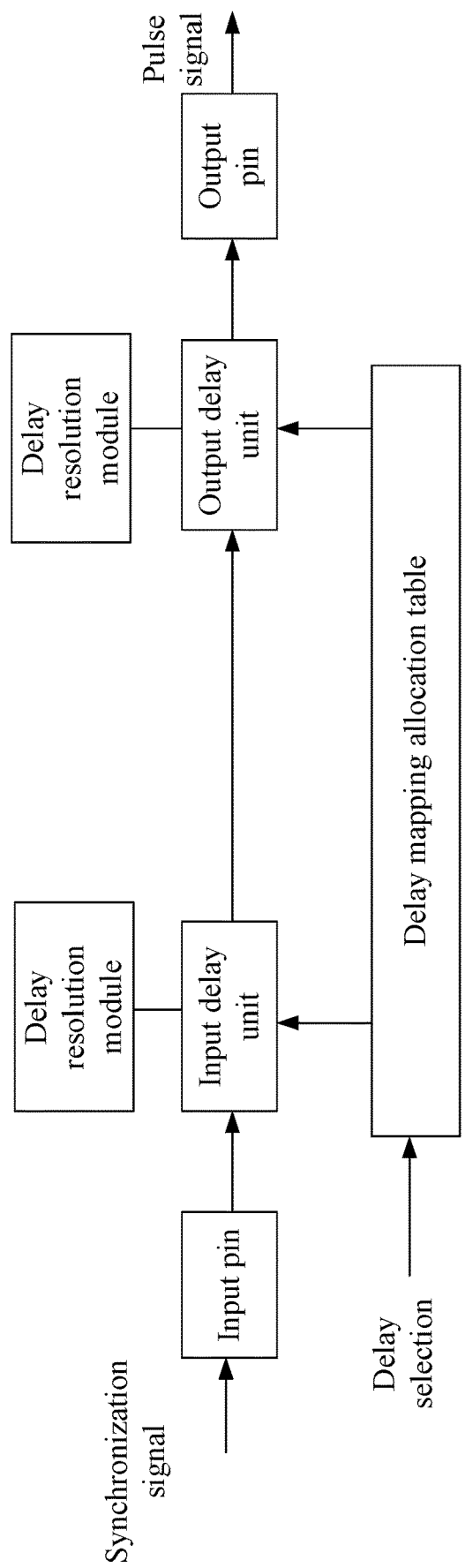
FIG. 10B is a schematic structural diagram of another tailored time delay module according to an embodiment of this application.
Figure 10C:
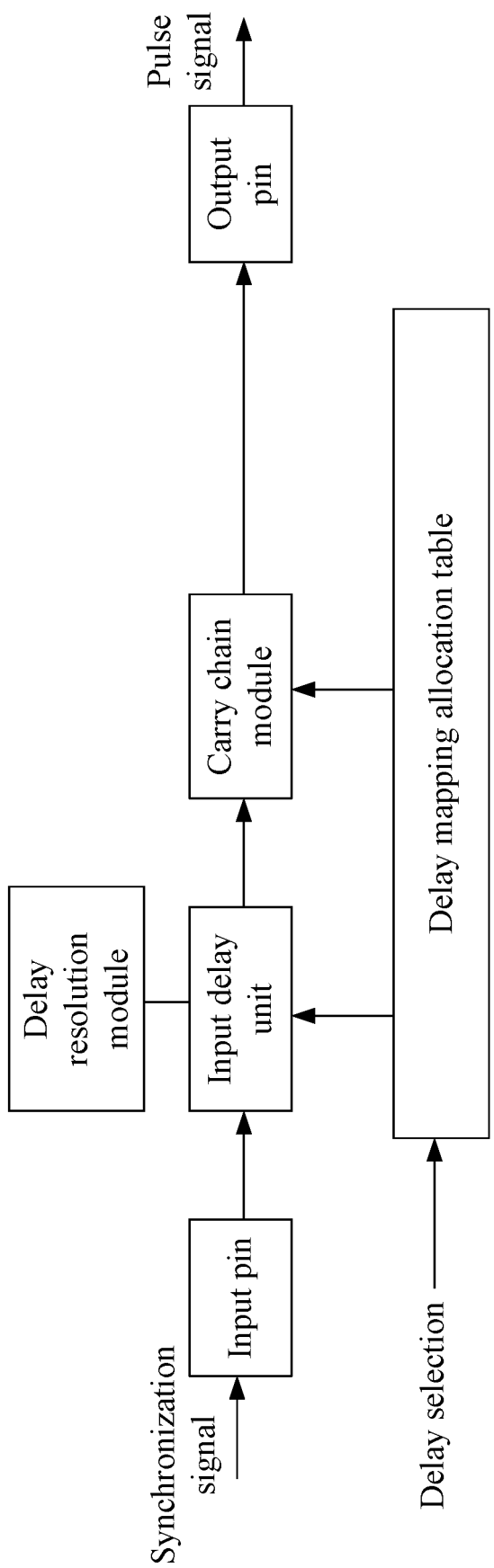
FIG. 10C is a schematic structural diagram of still another tailored time delay module according to an embodiment of this application.

For a tailored structure of the time delay module 1211, refer to FIG. 10A, FIG. 10B and FIG. 10C. FIG. 10A shows a time delay module 1211 obtained after removing the input delay unit, and a delay resolution module (IDELYCTRL) corresponding to the input delay unit is also correspondingly removed. FIG. 10B shows a time delay module 1211 obtained by removing the carry chain module. FIG. 10C shows the time delay module 1211 obtained after removing the output delay unit, and a delay resolution module (IDELYCTRL) corresponding to the output delay unit is also correspondingly removed.

Figure 11:
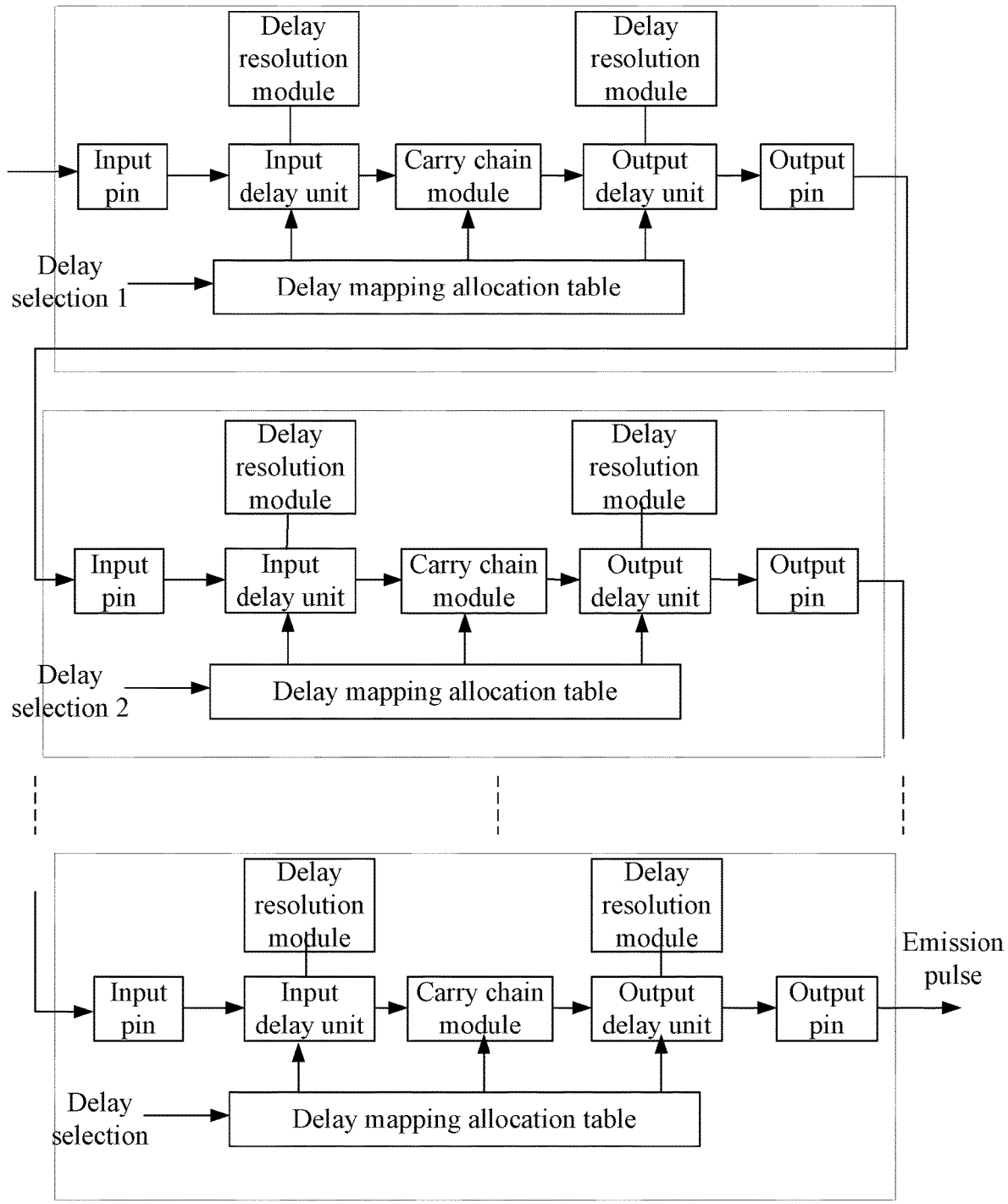
FIG. 11 is a schematic structural diagram of cascaded time delay modules according to an embodiment of this application.

When a longer delay is required, a plurality of time delay modules 1211 can be cascaded. As shown in FIG. 11, the output of each stage is linked to the input of the next stage, and the number of time delay modules 1211 can be determined according to the required time delay. Details are not described again in this application. Certainly, the input delay unit (IDELAY), the carry chain module, and the output delay unit (ODELAY) inside the cascaded time delay module 1211 can also be tailored. For a tailoring method, refer to the foregoing embodiment. Details are not described herein again.

In addition, it should be noted that the duration of the delay unit is less than T, and in an embodiment, the duration of the delay unit is less than 1/2T, where T is a period corresponding to the working frequency of the TDC, that is, assuming that the working frequency of the TDC is f, where T=1/f. Histograms in n measurement periods are superimposed, and a random value or a regular value can be used for time of n delays. Delay time can be determined based on the preset delay policy. The delay mapping allocation table is also determined based on the preset delay policy.

Figure 12:
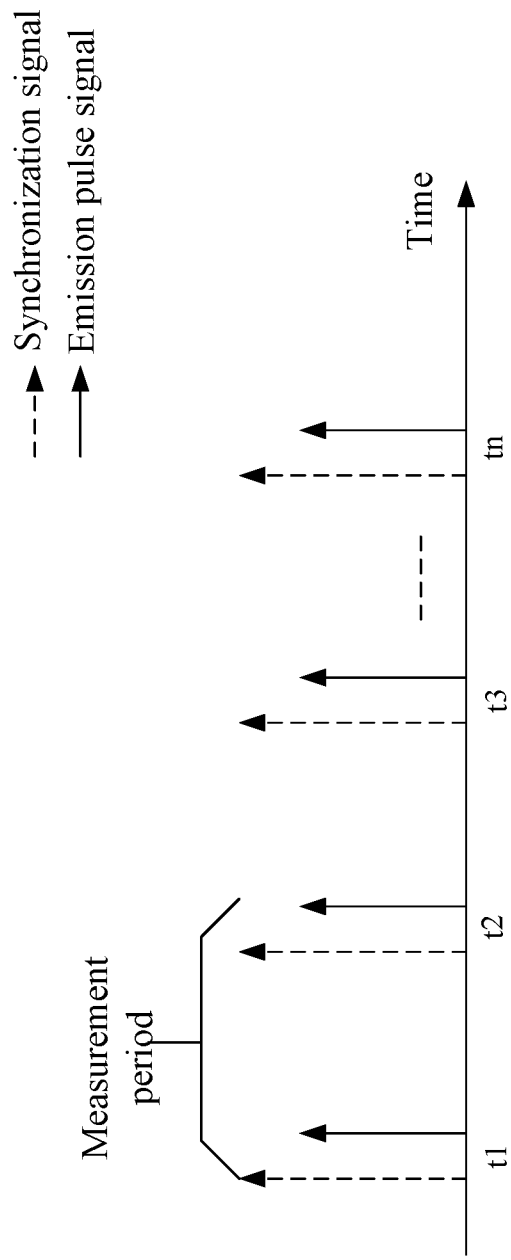
FIG. 12 is a schematic diagram of time delay of a synchronization signal and an emission pulse signal according to an embodiment of this application.

Exemplarily, as shown in FIG. 12, delays of synchronization signals and emission pulse signals corresponding to n measurement periods are {t1, t2, t3, . . . , tn} respectively. Values of {t1, t2, t3, . . . , tn} can be values with a regular difference, for example, the values are {1/2n*T, 2/2n*T, . . . , n/2n*T} respectively. The values of {t1, t2, t3, . . . , tn} can also be values with a regular difference in a shuffled order, or random values. Alternatively, some signals may be delayed, and some others may not be delayed. This can be determined based on a preset delay policy.

Further referring to FIG. 5, the foregoing receiving module 130 may include a photoelectric converter 131, a conditioning circuit 132, a TDC collecting assembly 133, and a data processing assembly 134.

The photoelectric converter 131 is configured to convert a received reflected signal into a current signal.

The conditioning circuit 132 is connected with the photoelectric converter 131 and configured to amplify the current signal, convert the current signal into a voltage signal and perform filtering, and then output the voltage signal to a TDC collecting assembly.

The TDC collecting assembly 133 is connected with the conditioning circuit 132 and configured to generate a histogram corresponding to the reflected signal based on a signal processed by the conditioning circuit 132 and the synchronization signal.

The data processing assembly 134 is connected with the TDC collecting assembly 133 and configured to superimpose n histograms output by the TDC collecting assembly to obtain a superimposed histogram, and determine a corresponding echo signal based on the superimposed histogram.

In this embodiment of this application, the TDC collecting assembly can be implemented by using an existing TDC. For a method of obtaining the histogram based on the synchronization signal and the received signal, refer to the existing method of generating the histogram. Details are not described again in this application.

Figure 13:
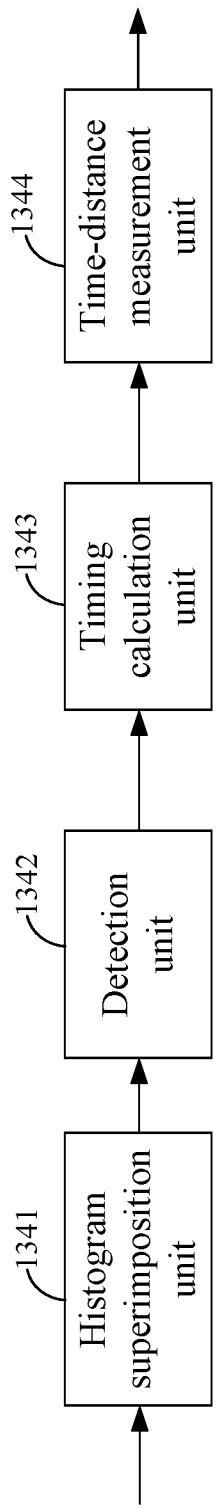
FIG. 13 is a schematic structural diagram of a data processing assembly according to an embodiment of this application.

Referring to FIG. 13, in this embodiment of this application, the data processing assembly 134 may include a histogram superimposition unit 1341, a detection unit 1342, a timing calculation unit 1343, and a time-distance measurement unit 1344.

The histogram superimposition unit 1341 is configured to superimpose the n histograms collected by the TDC collecting assembly 133, and the quantity of superimpositions is equal to the quantity of delayed transmissions.

Figure 14:
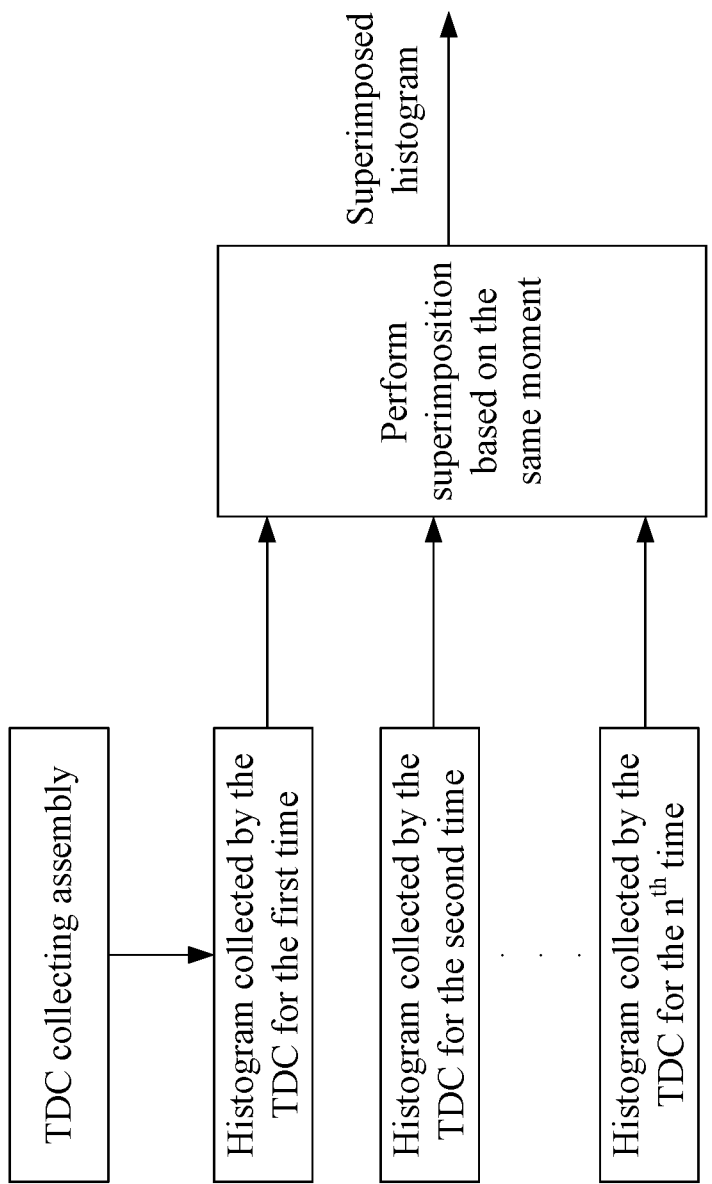
FIG. 14 is a schematic diagram of a working principle of a histogram superimposition unit according to an embodiment of this application.

In this embodiment of this application, a working principle of the histogram superimposition unit 1341 is shown in FIG. 14. That is, the histograms are superimposed by accumulating data at the same moment (for the superimposed histogram, refer to FIG. 4).

The detection unit 1342 is configured to perform detection according to the superimposed histogram, and identify an echo signal.

In an exemplary application, a threshold can be set, and if a result exceeds the threshold, it is determined that the echo signal is detected.

The timing calculation unit 1343 is configured to calculate timing. In some embodiments, the constant fraction timing, a half-value calculation method, a centroid calculation method, or a threshold calculation method can be used for calculation. Certainly, another method for calculating the timing of the echo signal can also be used.

The time-distance measurement unit 1344 is configured to measure a distance of a target object according to timing. In some embodiments, the existing measurement method can be used for measurement. This is not limited in this application.

Figure 15:
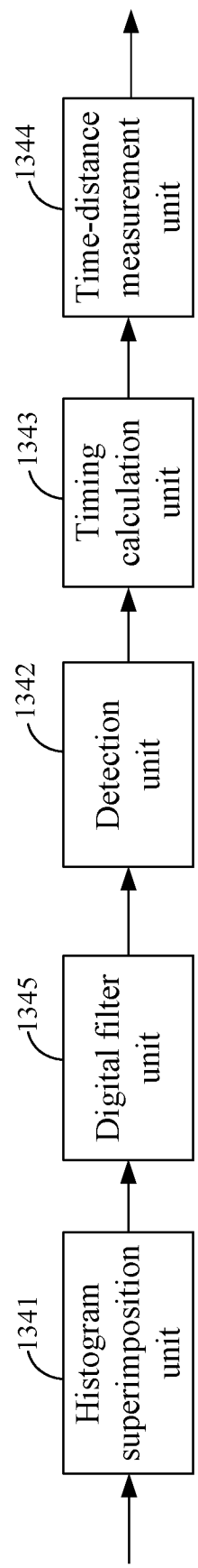
FIG. 15 is a schematic structural diagram of another data processing assembly according to an embodiment of this application.

In an embodiment of this application, referring to FIG. 15, the data processing assembly 134 may further include a digital filter unit 1345.

The digital filter unit 1345 is configured to filter a histogram waveform, to implement shaping and noise filtering for the histogram waveform.

It can be seen from the foregoing descriptions that, based on the radar data transceiver provided in the embodiments of this application, the synchronization signal can be finely jittered, so that there is a specific time difference between a plurality of emitted emission signals, and then histograms corresponding to a plurality of received reflected signals are superimposed, which can improve ranging precision. That is, ranging precision is improved, manufacturing costs of the radar are effectively reduced, and power consumption of the radar is also reduced without the need of increasing the sampling frequency of a TDC.

An embodiment of this application further provides a LiDAR, where the LiDAR includes the radar data transceiver as described in the foregoing embodiments. The LiDAR can be an area array LiDAR product and array LiDAR, or can be another type of LiDAR.

Based on the radar data transceiver, an embodiment of this application further provides a ranging method, applied to the radar data transceiver.

Figure 16:
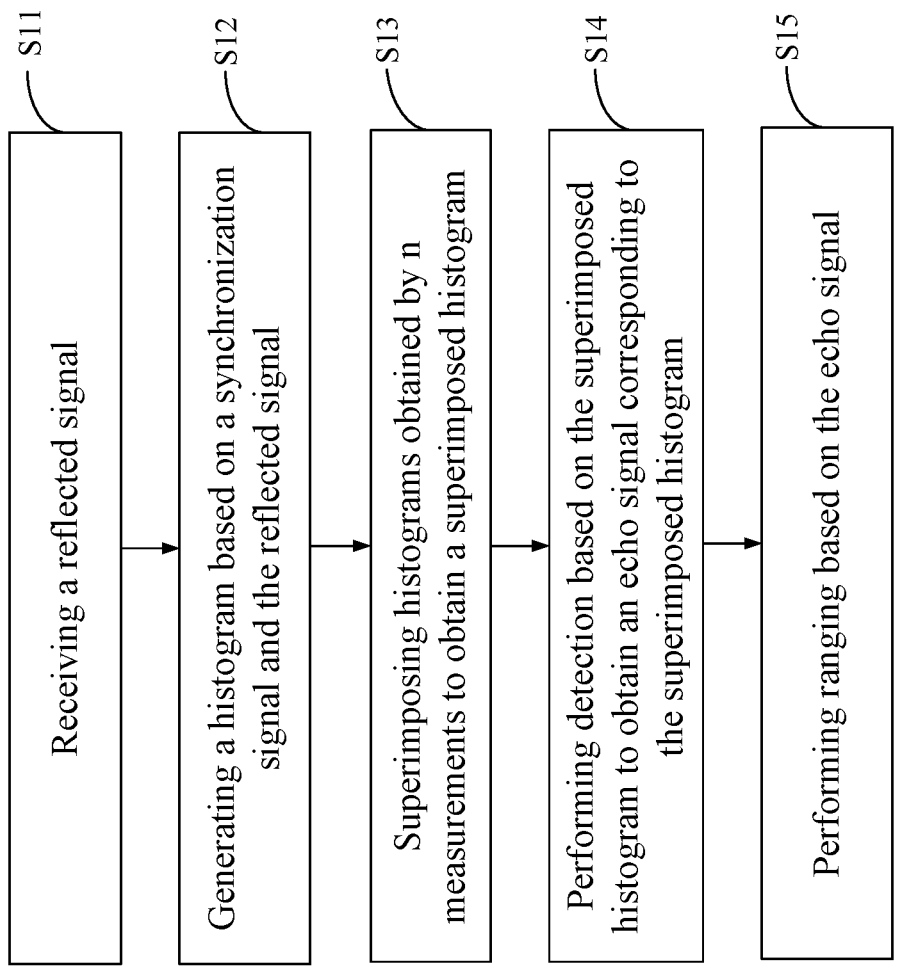
FIG. 16 is a schematic flowchart of an implementation of a ranging method according to an embodiment of this application.

Referring to FIG. 16. FIG. 16 is a schematic flowchart of a ranging method according to an embodiment of this application.

As shown in FIG. 16, the ranging method provided in this embodiment of this application may include steps S11 to S15. Details are described as follows:

S11. Receiving a reflected signal.

The reflected signal is a signal reflected after an emission signal emitted by the radar data transceiver based on the preset delay policy reaches a target object.

In this embodiment of this application, the number of received reflected signals is equal to the number of measurement periods.

S12. Generating a histogram based on a synchronization signal and the reflected signal.

In this embodiment of this application, the synchronization signal is generated by the synchronization module of the radar data transceiver, and the histogram can be generated by the TDC collecting assembly of the radar data transceiver based on the synchronization signal and the reflected signal.

S13. Superimposing histograms obtained by n measurements to obtain a superimposed histogram.

Herein, n is the number of measurement periods, and in some embodiments, n is an integer multiple of 2 or more.

In this embodiment of this application, when each measurement period starts, the emission module emits an emission signal, and the receiving module correspondingly receives a reflected signal, and then determines a histogram. The histograms obtained from n measurements (emission signals corresponding to different jittering/delay duration) are superimposed to obtain a histogram with higher measurement precision.

It should be noted that when the histograms are superimposed, data at the same moment is stacked.

S14. Performing detection based on the superimposed histogram to obtain an echo signal corresponding to the superimposed histogram.

In an exemplary application, a threshold can be preset, and when the superimposed histogram exceeds the threshold, the superimposed histogram is identified as the echo signal. For an exemplary implementation, refer to the descriptions in the embodiments of the foregoing radar data transceiver. Details are not described herein again.

S15. Performing ranging based on the echo signal.

In an exemplary application, the timing can be calculated according to the echo signal first, and then the distance can be calculated based on the timing. Similarly, for some implementations, refer to the descriptions in the embodiments of the foregoing radar data transceiver. Details are not described herein again.

In an embodiment of this application, before step S11, the ranging method may further include the following steps:

delay the synchronization signal according to a preset delay policy, generate an emission signal, and emit the emission signal.

For related content of delaying the synchronization signal based on the delay policy and generating the emission signal, refer to the related description of the emission module of the radar data transceiver. The emission signal can also be emitted by the laser emitter in the emission module.

It can be seen from the foregoing descriptions that, in the ranging method provided in the embodiments of this application, similarly, the synchronization signal can be finely jittered, so that there is a specific time difference between a plurality of emitted emission signals, and then histograms corresponding to a plurality of received reflected signals are superimposed, which can improve ranging precision. That is, ranging precision is improved, manufacturing costs of the radar are effectively reduced, and power consumption of the radar is also reduced without the need of increasing the sampling frequency of a TDC.

A person skilled in the art can understand that, for ease and brevity of description, the division of the foregoing functional units and modules is taken as an example for illustration. In actual application, the foregoing functions can be allocated to different units and modules and implemented according to a requirement, that is, an inner structure of the terminal device is divided into different functional units and modules to implement all or a part of the functions described above. The functional units and modules in the embodiments may be integrated into one processing unit, or each unit may exist alone physically, or two or more units may be integrated into one unit. The integrated unit may be implemented in a form of hardware, or may be implemented in a form of a software functional unit. In addition, the names of the functional units and modules are only for the convenience of distinguishing one another, and are not intended to limit the protection scope of this application. For a detailed working process of units and modules in the foregoing system, reference may be made to a corresponding process in the foregoing method embodiments. Details are not described again herein.

In the foregoing embodiments, the descriptions of the embodiments have respective focuses. For a part that is not described in detail in one embodiment, reference may be made to related descriptions in other embodiments.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on applications and design constraints of the technical solutions. A person skilled in the art may use different methods to implement the described functions for each application, but it should not be considered that the implementation goes beyond the scope of this application.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A radar data transceiver, comprising:
a synchronization module, configured to generate a synchronization signal and send the synchronization signal to an emission module and a receiving module separately;
the emission module, connected with the synchronization module and configured to delay the synchronization signal according to a preset delay policy, generate an emission signal, and emit the emission signal; and
the receiving module, connected with the synchronization module and configured to receive a reflected signal, generate a histogram according to the reflected signal and the synchronization signal, and superimpose histograms obtained by n measurements corresponding to emission signals with different jittering or delay duration, to generate an echo signal,
wherein the receiving module comprises:
a photoelectric converter, configured to convert the received reflected signal into a current signal;
a conditioning circuit, connected with the photoelectric converter and configured to amplify the current signal, convert the current signal into a voltage signal and perform filtering, and then output the voltage signal to a TDC collecting assembly;
the TDC collecting assembly, connected with the conditioning circuit and configured to generate the histogram corresponding to the reflected signal based on the signal output by the conditioning circuit and the synchronization signal; and
a data processing assembly, connected with the TDC collecting assembly and configured to superimpose n histograms output by the TDC collecting assembly to obtain a superimposed histogram, and determine a corresponding echo signal based on the superimposed histogram,
wherein n is an integer greater than or equal to 2.

2. The radar data transceiver according to claim 1, wherein the emission module comprises:
an emission fine-jittering assembly, configured to delay the synchronization signal according to the preset delay policy to generate an emission pulse signal;
a drive circuit, connected with the emission fine-jittering assembly and configured to drive the emission pulse signal, generate a current signal, and output the current signal to a laser emitter; and
the laser emitter, connected with the drive circuit and configured to generate the emission signal based on the current signal, and emit the emission signal.

3. The radar data transceiver according to claim 2, wherein the emission fine-jittering assembly comprises:
a time delay module, configured to delay the synchronization signal and generate the emission pulse signal; and a delay policy selection module, connected with the time delay module and configured to determine the preset delay policy.

4. The radar data transceiver according to claim 3, wherein the time delay module comprises n PCB wires and a switch selection assembly.

5. The radar data transceiver according to claim 3, wherein the time delay module comprises an input pin, an input delay unit, a delay resolution module, a carry chain module, an output delay unit, an output pin, and a delay mapping allocation table.

6. The radar data transceiver according to claim 3, wherein the time delay module comprises a delay resolution module, a carry chain module, an output delay unit, an output pin, and a delay mapping allocation table.

7. The radar data transceiver according to claim 3, wherein the time delay module comprises an input delay unit, a delay resolution module, an output delay unit, an output pin, and a delay mapping allocation table.

8. The radar data transceiver according to claim 3, wherein the time delay module comprises an input delay unit, a delay resolution module, a carry chain module, an output pin, and a delay mapping allocation table.

* * * * *